Feb. 22, 1966 G. A. MITCHELL 3,236,581
CAMERA VIEWFINDER
Filed Nov. 12, 1964 2 Sheets-Sheet 1

INVENTOR.
GEORGE A. MITCHELL
BY Forrest J. Lilly
ATTORNEY

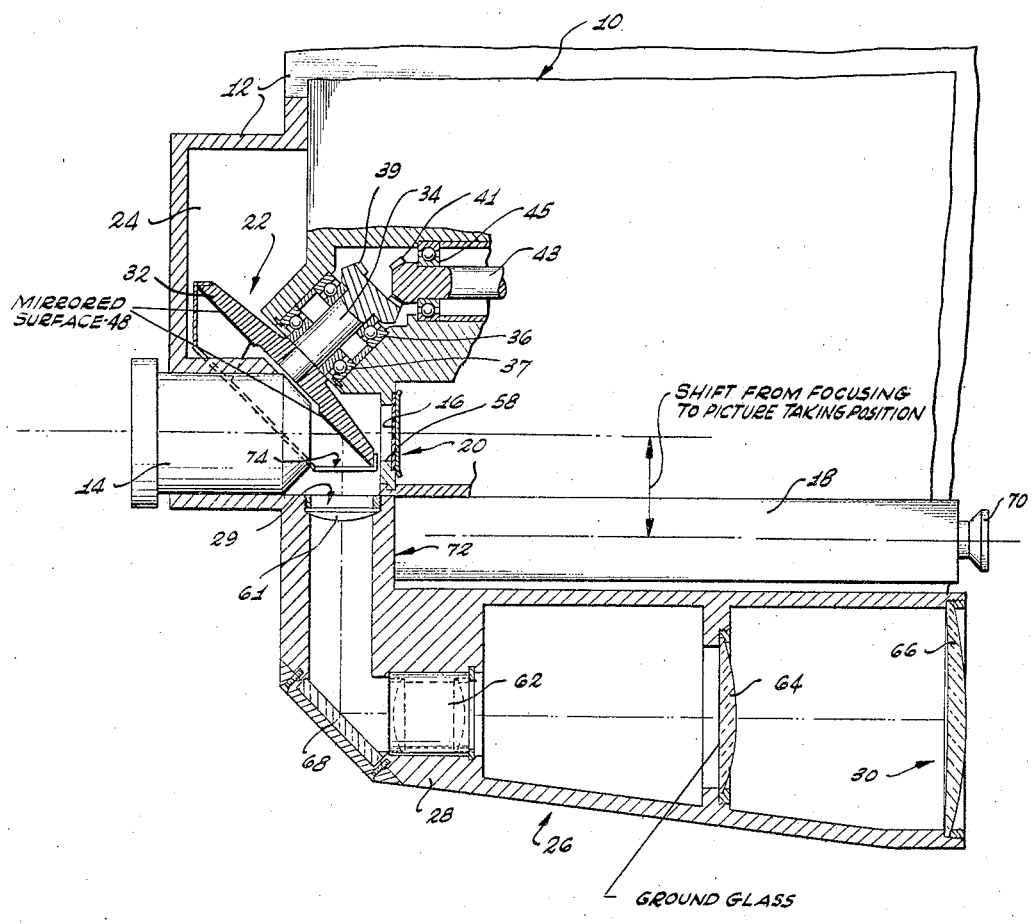

United States Patent Office 3,236,581
Patented Feb. 22, 1966

3,236,581
CAMERA VIEWFINDER
George A. Mitchell, 687 Prospect Crescent,
Pasadena, Calif.
Filed Nov. 12, 1964, Ser. No. 410,486
1 Claim. (Cl. 352—206)

This invention relates generally to optical viewfinder systems for motion picture cameras, and more particularly to improvements in camera viewfinders of the type which eliminate parallax between the viewfinder system and the picture taking system.

In the photographic industry, it has been common practice for many years to provide cameras with optical viewfinder systems designed to avoid parallax. In still cameras of the single lens reflex type, the non-parallax viewfinder system usually includes a fully reflecting mirror which is pivotally mounted for movement between two positions, the first position being one wherein the mirror intersects the optical axis of the picture taking system behind the objective lens, and the second position being one wherein the mirror is swung out of the way of the picture taking system. However, with such systems, the subject being photographed cannot be viewed during the picture taking operation.

In motion picture cameras, where the subject being photographed must be continuously viewed throughout the picture taking operation, it has been common practice to utilize a reflex viewfinder system which is very similar to that used with still cameras. However, the viewfinder mirror is replaced by a light reflecting camera shutter which rotates between the camera lens and the film plane. Such a shutter provides a fully reflecting surface which intermittently intersects the optical axis of the picture taking system and directs image forming light through a focusing tube viewfinder system. The surface of the shutter is apertured to pass light to the camera film plane between each pair of shutter light reflecting intervals. Hence, each film frame is photographed without any loss of light to the viewfinder system. On the other hand, the light reflection repetition rate of the rotating shutter is sufficiently high that, by virtue of persistence of vision, it appears to the eye of an observer that a continuous viewfinder image is being presented.

One drawback of motion picture cameras using reflex viewfinder systems has been that the film can be fogged by light entering the camera through the viewfinder system. Although this does not present too much of a problem while the eye of an observer is closing off the eyepiece at one end of the viewfinder, it does require that the eyepiece be appropriately capped to prevent entrance of light when an observer is not looking through the viewfinder.

In addition, because motion picture viewfinder systems of the aforedescribed focusing tube type are "one eyed" viewing systems, an auxiliary viewfinder outside the camera proper is often utilized for viewing the subject during the picture taking operation. Such viewfinders permit the subject to be viewed with both eyes and by several observers at the same time. To partially compensate for parallax, the external viewfinder is pivotally mounted so that its field of view can be tailored to match that of the camera objective lens at a prescribed subject plane. However, it will be apparent that parallax can only be eliminated in the single subject plane passing through the intersection between the optical axes of the picture taking and viewfinder systems, and parallax will still exist for the foreground and background relative to the prescribed subject plane.

Accordingly, it is an object of the present invention to provide a new and improved camera viewfinder system which overcomes the above and other disadvantages of the prior art.

Another object of this invention is the provision of a new and improved non-parallax viewfinder system for a motion picture camera, wherein film fogging by stray light entering the camera through the viewfinder system is prevented.

A further object is to provide a new and improved camera viewfinder which eliminates parallax between the viewing and picture taking systems and provides an image of the subject being photographed which can be viewed simultaneously with both eyes and by several observers.

Still another object is to provide a new and improved non-parallax camera viewfinder embodying a light reflecting shutter of new and improved construction whereby fogging light cannot reach the camera film plane through the viewfinder.

The above and other objects and advantages of this invention will become apparent from the following description, when taken in conjunction with the accompanying drawings of an illustrative embodiment thereof, and wherein:

FIG. 4 is a partial plan view similar to FIG. 1, but with the focusing tube and shutter shifted to their normal positions for the picture taking operation.

Briefly, and in general terms, the foregoing objectives are achieved by providing a light reflecting shutter of new and improved construction whereby the film in the camera is always shielded by some portion of the shutter from light entering the camera through the viewfinder.

Figure 1:
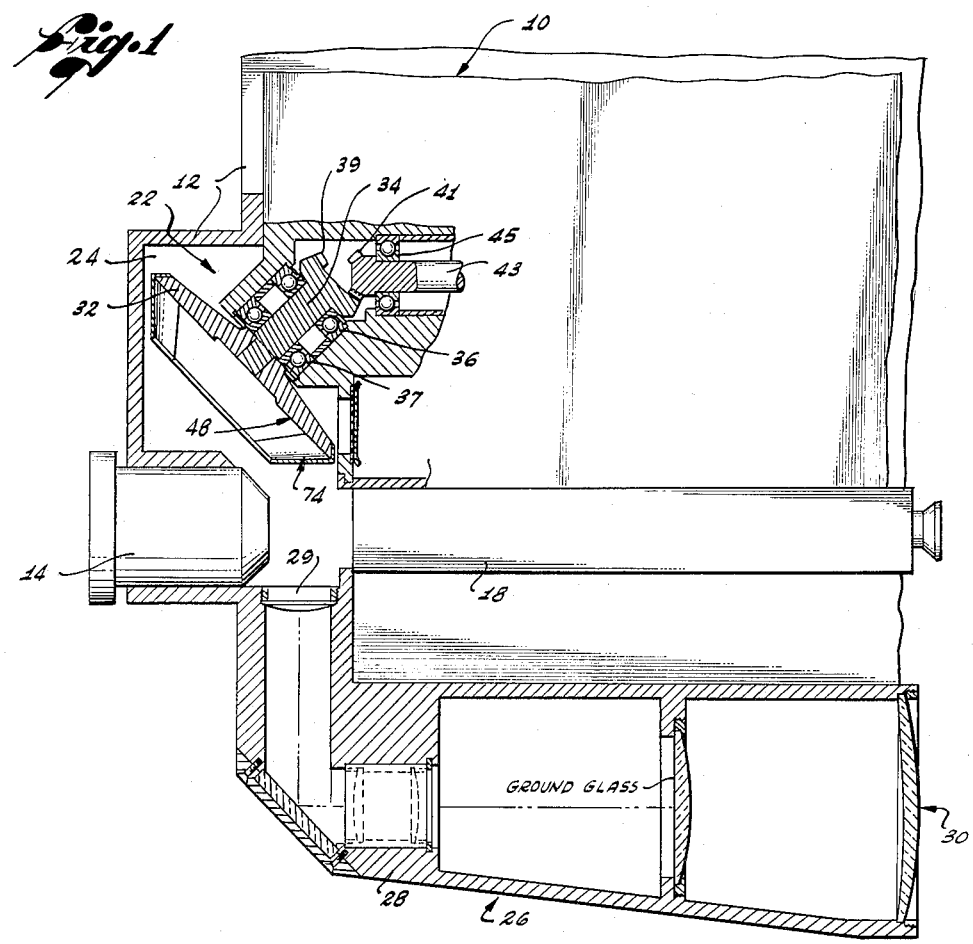
FIG. 1 is a partial plan view of a camera embodying a viewfinder system in accordance with the present invention, portions of the camera being shown in section to illustrate internal construction, the camera focusing tube being shown in its focusing position behind the camera objective lens.

Referring now to the drawings, and particularly to FIGS. 1 and 4 thereof, there is shown a motion picture camera 10 having a camera base 12. A conventional objective lens 14 is mounted at the forward end of the base 12 for forming an image upon a photographic film 16 within the camera 10 during the picture taking operation. The objective lens 14 may be either fixed or interchangeably mounted upon the camera base 12.

A conventional focusing tube 18 is mounted at one side of the camera 10 and is adapted to be selectively positioned behind the film plane of the camera, to enable precise focusing of the objective lens 14 on a specific subject which it is desired to photograph. In this connection, FIG. 1 shows the camera 10 with the focusing tube 18 in its focusing position behind the objective lens 14, whereas FIG. 4 shows the focusing tube shifted out of alignment with the optical axis of the objective lens and replaced by the film 16 in proper position behind the objective lens for the picture taking operation.

In the arrangement shown in FIGS. 1 and 4, the entire film gate assembly 20 and shutter mechanism 22 are mounted within the camera 10 for movement with the focusing tube 18 as a single unit relative to the camera base 12. In this regard, the forward end of the camera base 12 is shaped to define an inner chamber or compartment 24 of adequate size to accommodate the shutter mechanism 22 over the entire range of movement between the focusing position of FIG. 1 and the picture taking position of FIG. 4.

A camera viewfinder system 26 is mounted within a suitable housing 28 which is either integral with or secured in any appropriate manner to the camera base 12. The viewfinder system 26 within the housing 28 includes an input end 29 adapted to receive image forming light and an output end 30 at which an image of the object being photographed can be viewed.

It will be apparent in FIG. 1 that, with the focusing tube 18 in the focusing position, all of the light passed by the camera objective lens 14 is directed to the focusing tube, and none of the light passed by the objective lens is directed to the input end 29 of the viewfinder system 26. On the other hand, when the focusing tube 18 is shifted to the picture taking position of FIG. 4, the shutter mechanism 22 is positioned behind the objective lens 14 to direct a portion of the light passed by the objective lens to the input end 29 of the viewfinder system.

Referring now to FIGS. 1-4, the shutter mechanism 22 includes a preferably circular shutter plate or disc member 32 of metal or the like affixed to one end of a shaft 34 which is journaled for rotation in a pair of bearings 36, 37. The end of the shaft 34 opposite that carrying the shutter disc 32 is provided with a first bevel gear 39 in mesh with a second bevel gear 41 at one end of a shutter drive shaft 43. The shutter drive shaft 43 is journaled for rotation in a bearing 45. Hence, rotation of the shutter drive shaft 43 produces timed rotation of the shutter disc 32 about the shaft 34 as an axis.

Figures 2, 3:
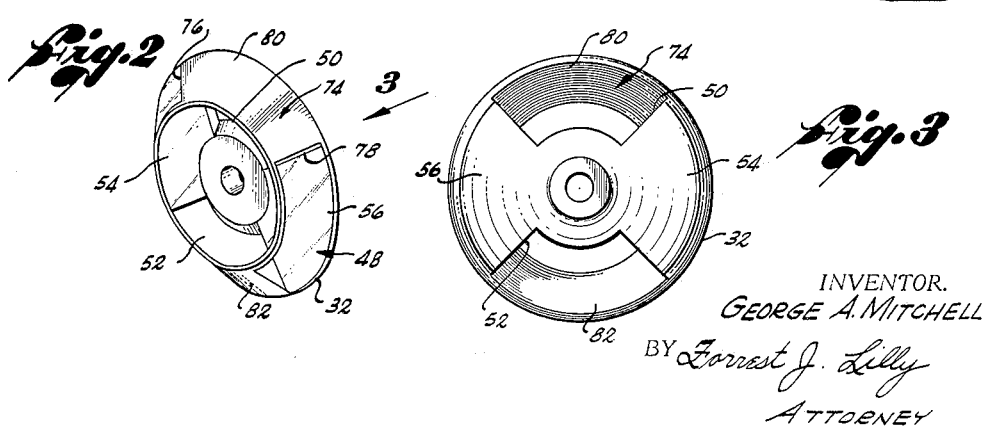
FIG. 2 is a perspective view of the shutter used with the camera of FIG. 1.
FIG. 3 is a rear elevational view of the shutter shown in FIG. 2.

Referring now more particularly to FIGS. 2-4, the shutter disc 32 is provided with a planar front surface 48 which is rendered highly reflective in any appropriate manner, e.g., as by silvering or highly polishing the metal surface of the shutter disc. A pair of annular apertures 50, 52 are provided in the shutter disc 32, and these apertures are angularly spaced apart by intervening opaque sectors 54, 56. Hence four shutter disc sectors or quadrants are defined in an alternating light reflective and light transmissive array.

As best observed in FIG. 4, the planar surfaces 48 of the shutter disc sectors 54, 56 lie in a plane which is inclined at a 45° angle to the optical axis of the camera objective lens 14. Hence, whenever light passing through the objective lens 14 impinges upon the reflective surface 48, the light is reflected therefrom at an angle of 90° with the optical axis of the objective lens to the input end 29 of the camera viewfinder system 26.

As the shutter disc 32 is rotated behind the objective lens 14, the light reflecting and apertured portions of the shutter disc alternately pass in front of the film aperture 58 of the camera to alternately direct light passed by the objective lens to the viewfinder system 26 and to the film 16. In this connection, the speed of rotation of the shutter disc 32 may be adjusted by any appropriate means (not shown) to provide the desired shutter aperture repetition rate in front of the film 16, the latter repetition rate being equal to the desired camera speed in frames per second for the picture taking operation.

The repetition rate at which light is reflected from the mirrored surfaces 48 of the opaque shutter sectors 54, 56 to the viewfinder system 26 is equal to the aforedescribed aperture repetition rate. This rate is sufficiently high that the interruption frequency is not detected by the eye of an observer viewing an image at the output end 30 of the viewfinder system. Hence, it appears to the observer that he is continuously viewing the subject being photographed during the picture taking operation.

With the aforedescribed arrangement, all of the light passed by the objective lens 14 is passed to the film 16 while each film frame is exposed, none of the light being lost of the viewfinder system. On the other hand, all of the light passed by the objective lens is directed to the viewfinder system 26 between film frame exposures, and none of the light is passed to the film plane during such viewing intervals. Hence, image brightness is equal in both the picture taking and viewfinder systems of the camera 10.

When the shutter mechanism 22 is shifted to the picture taking position shown in FIG. 4, the optical axis of the camera objective lens 14 coincides with the optical axis of the viewfinder system 26 between the subject being photographed and the reflex viewfinder mirror provided by the reflecting surfaces 48 of the shutter disc 32. Hence, there is no parallax between what is observed by the viewfinder system and what is observed by the picture taking system. This is true not only for the primary subject plane focused upon, but for the foreground and background relative to this subject plane as well.

The light which impinges upon the reflecting surfaces 48 of the shutter disc 32 is reflected along the optical axis of the viewfinder system 26 to appropriate image forming optics for producing an image of the subject upon a ground glass surface 60 or the like. The viewfinder image forming optics includes a field or collective lens 61, an objective lens 62, a pair of positive magnifying lenses 64, 66 and a mirror 68. The viewfinder optical system corrects for image inversion due to the camera objective lens 14 and also corrects for lateral image reversal due to reflection from the shutter surfaces 48.

The objective lens 62 may be located either between the field lens 61 and the mirror 68 or between the latter mirror and the lens 64, depending upon the particular focal lengths involved.

In the particular embodiment illustrated, the lens 64 is a plano-convex element and the ground glass surface 60 is actually provided upon the planar surface of the lens 64. The lenses 64 and 66 cooperate to provide an enlarged viewfinder image at the output end 30 that can be viewed with both eyes and simultaneously by several observers.

As best observed in FIG. 4, light entering the focusing tube 18 through the focusing tube eyepiece 70 cannot reach and fog the film 16 during the picture taking operation, since the end of the focusing tube remote from the eyepiece is automatically sealed off at 72 when the focusing tube is shifted from its focusing position.

In accordance with the present invention, a shielding member 74 is mounted upon the shutter disc 32 for rotation therewith to prevent stray light from reaching the film 16 through the viewfinder system 26 each time the film is exposed through one of the shutter apertures 50, 52.

The shielding member 74 extends forwardly of the shutter disc 32 and comprises a conical section coaxial with the shutter disc and secured in any appropriate manner to the shutter disc along the outer periphery of the disc. In the preferred embodiment of the invention, the conical sides of the shielding member 74 are inclined at an angle of 45° to the reflecting surface 48 of the shutter disc 32, so that the sides of the shileding member are essentially perpendicular to the optical axis of the viewfinder system 26 at the input end 29 of the view finder system. Although the conical sides of the shielding member 74 may be tapered at other angles, the 45° angle is the most practical from the standpoint of efficient use of space and material.

As best observed in FIGS. 2 and 3, the shielding member 74 is provided with a pair of apertures 76, 78 which are spaced from each other by opaque shielding sections 80, 82. The apertures 76, 78 in the shileding member 74 are in angular registry with the reflecting sectors 54, 56, respectively, of the shutter disc 32. Hence, whenever light passed by the camera objective lens 14 is reflected from the surface 48 of the shutter disc 32, the apertures in the shielding member 74 permit the reflected light to reach the input end 29 of the viewfinder system 26. However, while light can reach the viewfinder system 26, no light can reach the film 16 through the viewfinder system since one of the shutter disc sectors 54 or 56 will be shielding the film each time one of the shielding member apertures 76, 78 is opposite the input end 29 of the viewfinder system.

On the other hand, each time one of the shutter disc apertures 50, 52 passes in front of the film 16 to expose a film frame, one of the opaque sections 80, 82 of the shielding member 74 will pass in front of the input end 29 of the viewfinder system 26 to prevent light from reaching the film via the viewfinder system.

In essence, therefore, the shielding member 74 performs the function of a second shutter which provides a light exposure cycle for the viewfinder system 26 which is 180° in time out of phase with the exposure cycle provided by the shutter disc 32 for the film 16. Hence, there is never a clear light path between the film 16 and the viewfinder system 26, so that film fogging due to stray light entering the camera 10 through the output end 30 of the viewfinder system is eliminated.

The width of the apertures 76, 78 and opaque sections 80, 82 of the shielding member 74 is sufficient to provide the desired shielding during exposure of the film 16 and to impose no restriction on the field of the viewfinder image during the viewing portion of the cycle. In addition, the outer surface of each of the opaque sections 80, 82 of the shielding member 74 may be provided with a low reflectance coating, e.g., black paint or the like, to further enhance the light shielding efficiency of each of these shielding sections.

The present invention satisfies a long existing need in the optical industry for a non-parallax camera viewfinder system which permits continuous viewing of the subject being photographed by both eyes and several observers and without danger of film fogging by light entering the camera through the viewfinder system.

It will be apparent from the foregoing that, while a particular form of my invention has been illustrated and described, various modifications can be made without departing from the spirit and scope of my invention. Accordingly, I do not intend that my invention be limited, except as by the appended claim.

I claim:
A motion picture camera construction, comprising:
a camera;
a camera base;
a camera objective lens mounted upon said base;
means for supporting a photographic film at a film station within said camera behind said lens;
first rotary shutter means within said camera, said shutter means having a circular shutter disc interposed between said lens and said film station and having a forward planar surface inclined at an angle of 45° to the optical axis of said lens, said shutter disc having a plurality of alternate light transmissive and opaque sectors, said opaque sectors being light reflective to reflect light from said objective lens at right angles to the optical axis of said lens;
optical viewfinder means mounted upon said camera base for receiving the light reflected from said opaque sectors of said shutter disc and forming an enlarged image of the image produced by said objective lens;
second rotary shutter means mounted upon said first shutter means and interposed between said first shutter means and said viewfinder means, said second shutter means having alternate light transmissive and opaque sections, said second shutter means being synchronized with said first shutter means such that said opaque sections of said second shutter means block off the light path between said viewfinder means and said first shutter means whenever any of said light transmissive sectors of said first shutter means are passing light from said objective lens to said film station and such that said light transmissive sections of said second shutter means pass light to said viewfinder means only whenever any of said opaque sectors of said first shutter means are blocking off the light path between said objective lens and said film station, whereby light entering said camera through said viewfinder means cannot reach said film station;
means for rotating said first and said second shutter means;
a focusing tube mounted upon said camera; and
means for selectively shifting said camera relative to said camera base to move said focusing tube between a first position along the optical axis of said objective lens for focusing said lens and a second position of said focusing tube removed from said optical axis for the picture taking operation.

References Cited by the Examiner

UNITED STATES PATENTS

| | | | |
|---|---|---|---|
| 1,275,249 | 8/1918 | Hlavaty | 352—139 |
| 1,340,557 | 5/1920 | Pennypacker | 352—206 |
| 1,836,340 | 12/1931 | Ross | 352—206 |
| 1,962,321 | 6/1934 | Moreno | 94—42 |
| 2,029,418 | 2/1936 | Friedland | 352—206 |

NORTON ANSHER, *Primary Examiner.*

H. H. FLANDERS, *Assistant Examiner.*